(12) United States Patent
Khosrowpour et al.

(10) Patent No.: US 8,695,104 B2
(45) Date of Patent: Apr. 8, 2014

(54) SYSTEM AND METHOD FOR CREATING CONDITIONAL IMMUTABLE OBJECTS IN A STORAGE DEVICE

(75) Inventors: Farzad Khosrowpour, Pflugerville, TX (US); Marco A. Peereboom, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 442 days.

(21) Appl. No.: 12/766,090

(22) Filed: Apr. 23, 2010

(65) Prior Publication Data

US 2011/0265176 A1  Oct. 27, 2011

(51) Int. Cl.
*H04L 29/06* (2006.01)
(52) U.S. Cl.
USPC ............... 726/27; 726/26; 713/165; 713/166
(58) Field of Classification Search
USPC .......................................................... 726/27
See application file for complete search history.

(56) References Cited

U.S. PATENT DOCUMENTS

| | | | |
|---|---|---|---|
| 6,446,209 B2 * | 9/2002 | Kern et al. | 713/193 |
| 7,155,460 B2 | 12/2006 | McGovern et al. | |
| 7,487,178 B2 | 2/2009 | Hsu et al. | |
| 2002/0156767 A1 * | 10/2002 | Costa et al. | 707/1 |
| 2006/0010288 A1 | 1/2006 | Marks et al. | |
| 2006/0080316 A1 * | 4/2006 | Gilmore et al. | 707/9 |
| 2006/0085413 A1 * | 4/2006 | Ogawa et al. | 707/4 |
| 2006/0174085 A1 | 8/2006 | Wu et al. | |
| 2007/0078890 A1 * | 4/2007 | Hsu et al. | 707/103 R |
| 2009/0031292 A1 | 1/2009 | Fulton et al. | |
| 2009/0132774 A1 | 5/2009 | Bondurant et al. | |
| 2009/0198927 A1 | 8/2009 | Bondurant et al. | |

OTHER PUBLICATIONS

EMC Centera Content Addressed Storage, "Product Description Guide", retrieved from http://www.emc.com/collateral/hardware/data-sheet/c938-centera-guide.pdf, Published May 2004.*

* cited by examiner

*Primary Examiner* — Yogesh Paliwal
(74) *Attorney, Agent, or Firm* — Larson Newman, LLP

(57) ABSTRACT

A data storage system includes a storage device and a data handler that receives an object, creates metadata for the object that includes a key and an authorization, stores the object on the storage device, receives a request for the object, determines if the request includes the key, and, if the request has authorization information, permits access to the object. The data handler receives another request for the object, determines if the request includes the key, and, if the request does not have the authorization information, denies access to the object.

19 Claims, 5 Drawing Sheets

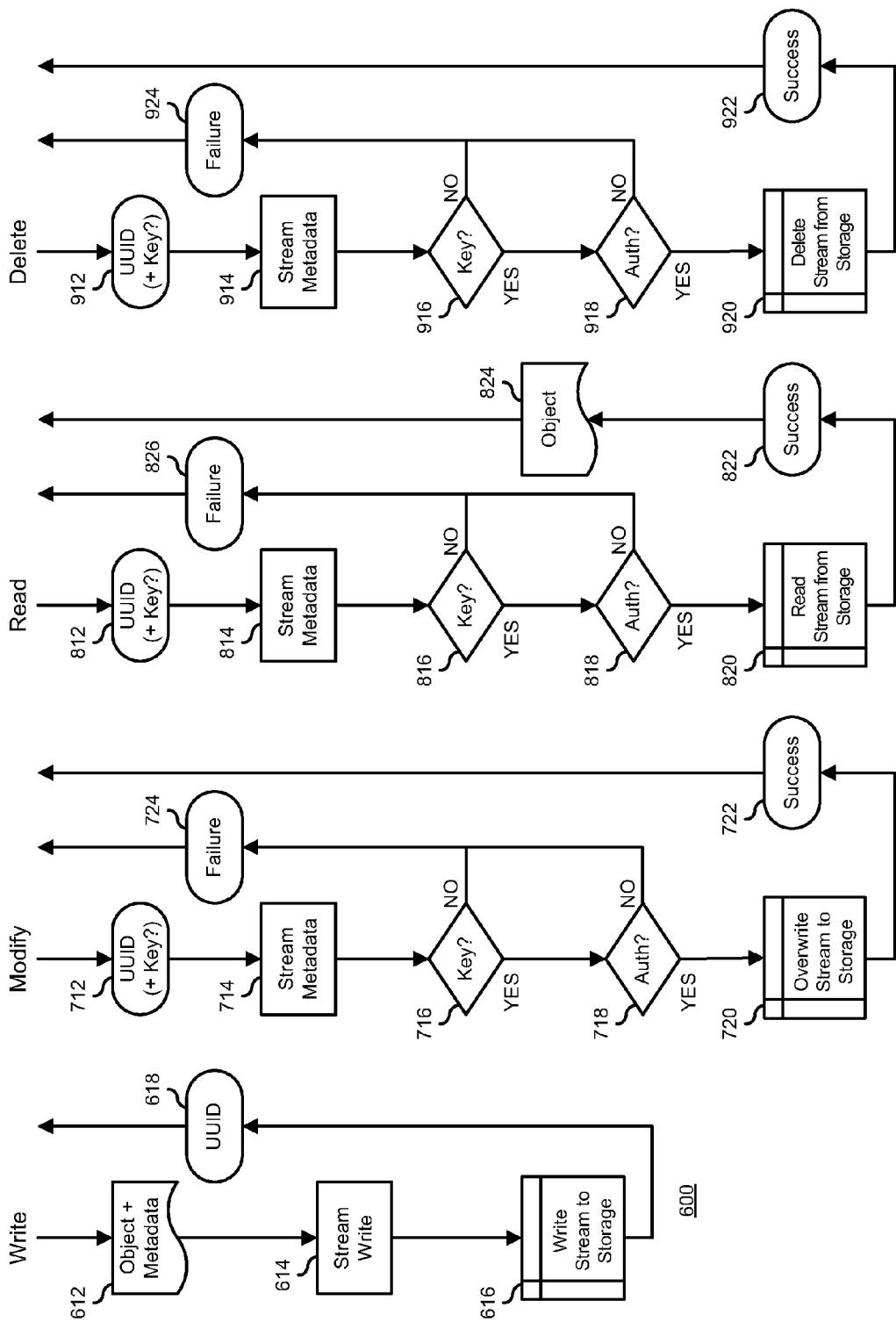

SYSTEM AND METHOD FOR CREATING CONDITIONAL IMMUTABLE OBJECTS IN A STORAGE DEVICE

FIELD OF THE DISCLOSURE

This disclosure relates generally to information handling systems, and relates more particularly to conditional immutable data storage in an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, data storage systems, and networking systems.

Regulatory requirements for data retention may require that certain information be maintained as immutable data at one time, but that the same information must be deleted at a later time. For example, regulations may require that employment records for an employee be stored permanently while the employee is employed, but the regulations may also require that the records be deleted within a certain time after employment ceases. An information handling system may include a Write-Once Read-Many (WORM) data storage systems to permanently retain data.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are illustrated and described with respect to the drawings presented herein, in which:

FIG. 6-9 include flowcharts illustrating a data handler write request, modify request, read request, and delete request.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can be used in this application. The teachings can also be used in other applications, and with several different types of architectures, such as distributed computing architectures, client/server architectures, or middleware server architectures and associated resources.

An information handling system can include a data storage system. In a particular embodiment, described herein, a host processing system writes data to, and reads data from the data storage system. The data storage system provides immutable data storage functionality, mutable data storage functionality, and conditional immutable data storage functionality for the information handling system. A non-limiting example of a data storage system includes disk memory, non-volatile random access memory such as FLASH or other non-volatile storage, another data storage system, or a combination thereof.

Figure 1:
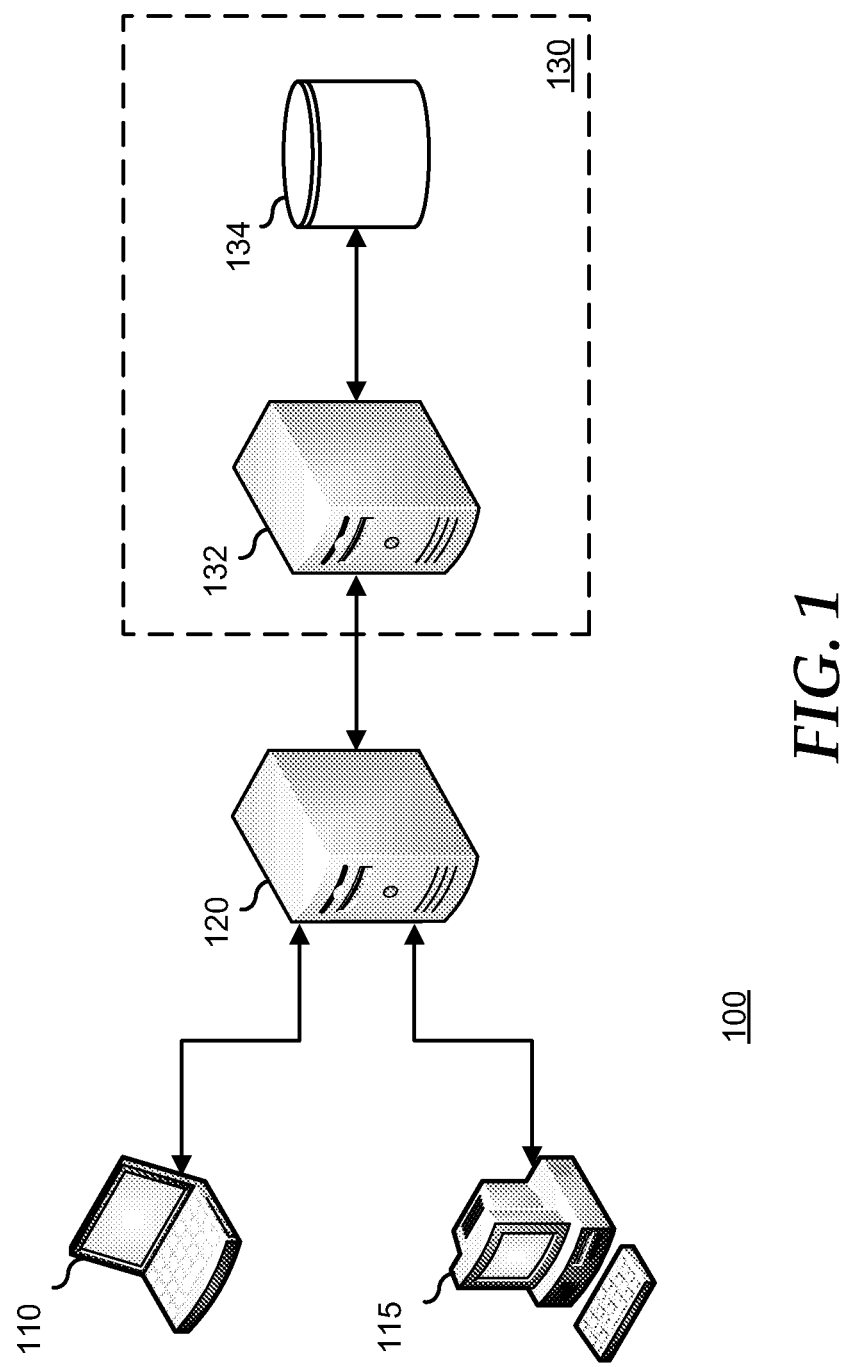
FIG. 1 is an illustration of a data storage system according to an embodiment of the present disclosure.

FIG. 1 illustrates a data storage system 100 according to an embodiment of the present disclosure, including client processing systems 110 and 115, a data handler 120, and a storage device 130. Storage device 130 includes a storage controller 132 and a storage medium 134, and can include other storage media (not illustrated). Client processing systems 110 and 115 are connected to data handler 120, and data handler 120 is connected to storage device 130. Client processing systems 110 and 115 are adapted to transfer data to and from storage device 130 over an interface such as a Small Computer System Interface (SCSI), a Peripheral Component Interconnect Express (PCI Express) interface, or another data communication interface.

Client processing systems 110 and 115 represent various users of the storage space on storage device 130. As such, client processing systems 110 and 115 can include one or more applications operated on an information handling system and that utilizes storage resources while running the application. For example, client processing systems 110 and 115 can include an e-mail processing environment with applications and servers available to process and store e-mail data, a database system operating to run one or more databases, a custom application such as a medical records system or human resource record system, another operating environment, or a combination thereof. Client processing systems 110 and 115 can also include one or more end user information handling systems. For example, client processing systems 110 and 115 can represent a single information handling system operated by a single end user or shared by multiple end users, or can represent a group of information handling systems with a common usage. For example, client processing system 110 can represent a group of managers that have a particular level of access to employee records on a human resource record system, and client processing system 115 can represent a group of human resources personnel that have a different level of access to the employee records.

Data handler 120 represents a shared resource between client processing systems 110 and 115 and storage device 130. Data handler 120 interacts with client processing systems 110 and 115 to process storage requests to read or write data to storage device 130, and interacts with storage device 130 to process the requests. Data handler 120 receives write requests from client processing systems 110 and 115. The write requests include an object that is to be written to storage device 130. Data handler 120 also receives read requests from client processing systems 110 and 115 to retrieve objects that have been previously written to storage device 130. Data handler 120 further receives delete requests from client processing systems 110 and 115 to delete objects that have been previously written to storage device 130. In each case, data handler 120 forwards the write requests, read requests, and delete requests to storage device 130. Data handling system 120 can be implemented as a hardware device, as a module of an information handling system, as an information handling system, or a combination thereof.

Figure 4:
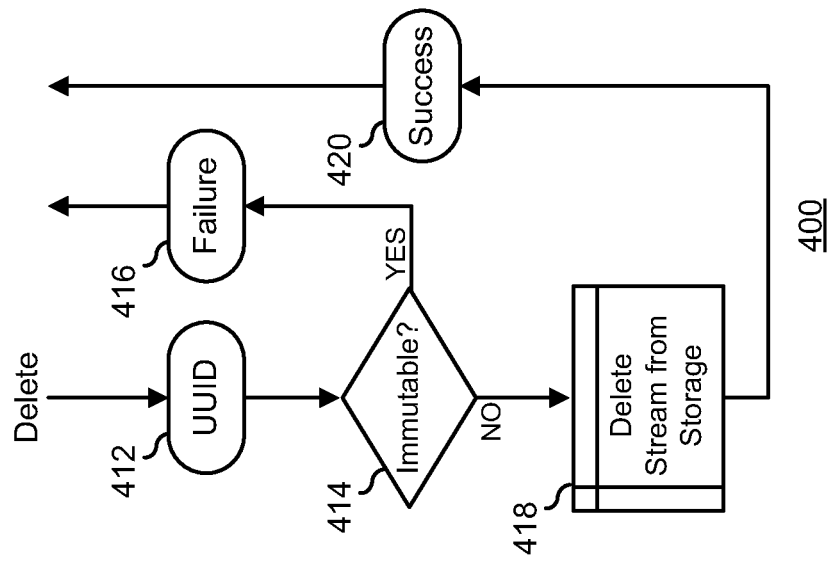
FIGS. 2-4 include flowcharts illustrating a storage controller write request, read request, and delete request.
Figure 3:
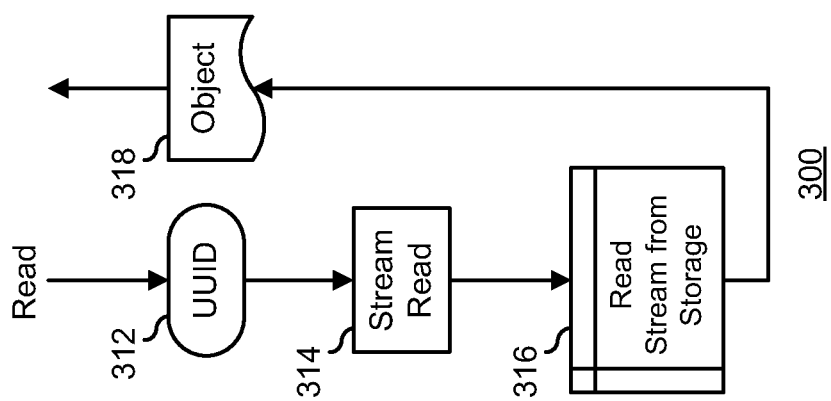
Figure 2:
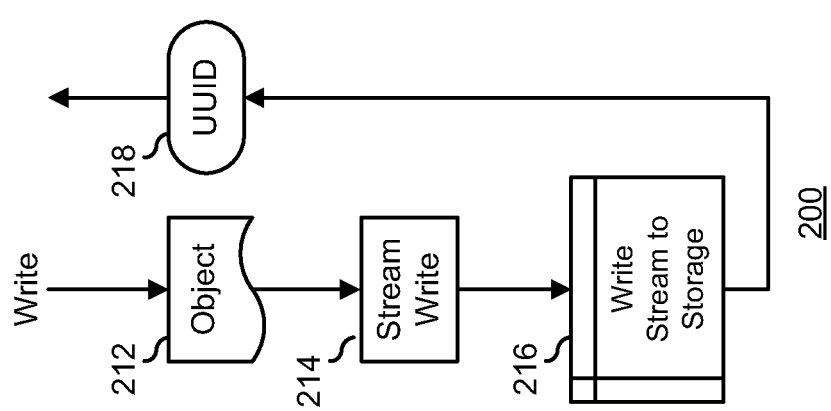

Storage device 130 represents a data storage device such as a direct-attached storage (DAS) system, a network-attached storage (NAS) system, a storage-area network (SAN), another storage device, or a combination thereof. Storage controller 132 receives the write requests, read requests, and delete requests from data handler 120, takes appropriate action to store, retrieve, or delete objects from storage medium 134, and provides the appropriate response back to data handler 120. FIGS. 2-4 include flowcharts showing how storage controller 132 responds to a write request 200, a read request 300, and a delete request 400. In FIG. 2, illustrating write request 200, storage controller 132 receives an object from data handler 120 in block 212. The object is streamed to storage media 134 in block 214, and the stream is written on storage media 134 in block 216. When the object is successfully written to storage media 134, a universally unique identifier (UUID) is generated by storage controller 132 and sent to data handler 120 in block 218. The UUID is associated with the location where the object is stored on storage media 134.

In FIG. 3, illustrating read request 300, storage controller 132 receives a UUID in block 312. The UUID is associated with the location of an object that is stored on storage media 134. Storage controller 132 determines the location associated with the UUID and initiates a stream read from storage media 134 in block 314. The object is read from storage media 134 in block 316, and the object is sent to data handler 120 in block 318.

In a particular embodiment, storage device 130 functions to provide immutable data storage, such that data, once written to storage media 134, cannot be overwritten or deleted. For example, storage media 134 can be implemented as a Write-Once Read-Many (WORM) storage device. In another embodiment, storage media 134 can include portions of the retained data that is immutable, while other portions of the retained data remain mutable. When some or all of storage media 134 includes immutable data, the delete request 400 is performed, as illustrated in FIG. 4. Storage controller 132 receives a UUID from data handler 120 in block 412. Storage controller 132 determines if the location associated with the UUID is immutable in decision block 414. If so, then the "NO" branch of decision block 414 is taken, indicating that the delete request is invalid, and storage controller 132 indicates that the delete request resulted in a failure to data handler 120 in block 416. If the location associated with the UUID is not immutable, then the "YES" branch of decision block 414 is taken, indicating that the delete request is valid, and the associated stream is deleted from storage media 134 in block 418. Storage controller 132 then indicates that the delete request 400 resulted in a success to data handler 120 in block 420.

In another embodiment, data handler 120 operates to provide three types of data storage on storage device 130, including immutable data, mutable data, and conditional immutable data, in addition to flexible mechanisms of controlling access to stored data. Immutable data is data that is intended to be retained indefinitely. Thus, once immutable data is written to storage media 134, subsequent modify or delete requests result in a failed request. Mutable data is data that can be overwritten or deleted. Conditional immutable data is data that is treated as immutable data in some circumstances, and treated as mutable data in other circumstances. For example, a particular object can be treated as immutable when accessed by client processing system 110, but can be treated as mutable when accessed by client processing system 115. In another example, a time limit can be placed on a particular object, such that before the time limit is expired, the object is immutable, but after that time the object is mutable.

Figure 5:
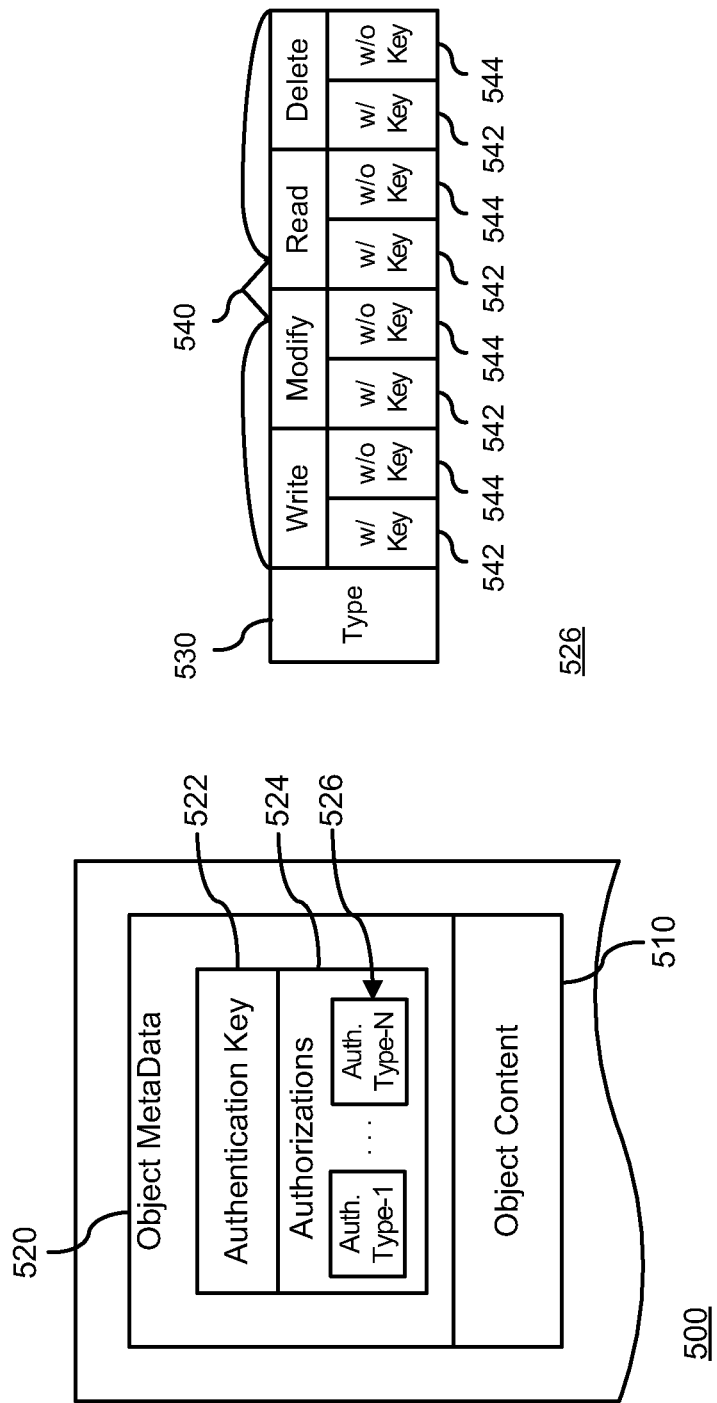
FIG. 5 is an illustration of a data object that provides for conditional immutable data operations on the data storage system of FIG. 1.

FIG. 5 illustrates a data object 500 that provides for conditional immutable data operations on data storage system 100, including object content 510 and object metadata 520. Object content 510 includes the content data provided from client processing systems 110 or 115 for storage in storage device 130. Object metadata 520 is information added to data object 500 by data handler 120 that provides for keyed conditional access to data object 500 and for authorization of access to the functions of data storage device 130. Object metadata 520 includes an authentication key 522 and an authorizations field 524.

Authentication key 522 provides a field for authenticating access requests to object content 510 in data object 500. Here, on creation of data object 500, data handler 120 determines a value for authentication key 522 to append in object metadata 520. After data object 500 is stored on storage device 130, requests to access data object 500 include an authentication key that is compared with authentication key 522. If the value of the provided authentication key matches the value of authentication key 522, then access to data object 500 as given in authorization field 524, described below, is granted. If the value of the provided authentication key does not match the value of authentication key 522, then access to data object 500 is denied. For example, data handler 120 generates authentication key 522 to append with object metadata 520 when object content 510 is to be written to storage device 130. For example, data handler 120 can generate a UUID associated with object content 510, and append the UUID as authentication key 522. Other examples include providing an authentication number using another securely generated identification number or other identification mechanism. In another embodiment, client systems 110 or 115 can provide an identification mechanism, a password, another means of identifying with object content 510, or a combination thereof.

Authorizations field 524 describes the actions permitted on data object 500. In a particular embodiment, authorizations field 524 includes one or more type authorization bit-fields 526. Type authorization bit-field 526 includes a type field 530, and operation fields 540. Each operation field 540 includes a key enabled field 542 and a keyless enabled field 544. Type field 530 indicates a particular feature or type of access to which the authorizations in operation fields 540 apply. For example, type field 530 can indicate that members of a particular group have the specified access, that access to the specified authorizations applies until a particular time, that access to the specified authorizations applies based upon another type of feature or type, or a combination thereof.

Operation fields 540 indicate whether or not a write access, a modify access, a read access, or a delete access is permitted when authentication key 522 is present, as indicated by the value of the associated key enabled field 542. Operation fields 540 also indicate whether or not a write access, a modify access, a read access, or a delete access is permitted when authentication key 522 is not present, as indicated by the value of the associated keyless enabled field 544. In a particular embodiment, a logic "1" can indicate that the associated feature is enabled. Thus, for example, a logic value of "1000 1110" would indicate that a write operation on storage device 130 is permitted only with an authorization key, a modify operation is not permitted, either with or without the authorization key, a read operation is permitted with or without the authorization key, and a delete operation is only permitted with an authorization key. In another embodiment (not illustrated), object metadata in a data object can include multiple authentication keys and multiple authorizations, thus different authorizations can be applied based upon the presence of different authentication keys.

FIGS. 6-9 include flowcharts showing how data handler 120 sends a write request 600, a modify request 700, a read request 800, and a delete request 900 to storage device 130, and the actions taken to store, modify, retrieve, or delete objects from storage medium 134. In FIG. 6, illustrating write request 600, storage controller 132 receives an object including object data and object metadata from data handler 120 in block 612. The object is streamed to storage media 134 in block 614, and the stream is written on storage media 134 in block 616. When the object is successfully written to storage media 134, a UUID is generated and sent to data handler 120 in block 618.

In FIG. 7, illustrating modify request 700, data handler 120 sends a UUID to storage controller 132 in block 712. The UUID may or may not include an authentication key. In response to receiving the UUID, storage controller 132 streams the metadata from the object associated with the UUID to data handler 120 in block 714. A decision is made as to whether or not the key provided in the UUID matches the key in the metadata in decision block 716. If not, the "NO" branch of decision block 716 is taken, and a modify failure is indicated in block 724. If the key provided in the UUID matches the key in the metadata, the "YES" branch of decision block 716 is taken, and a decision is made as to whether a modification to the object is authorized in decision block 718. If not, the "NO" branch of decision block 718 is taken, and a modify failure is indicated in block 724. If a modification to the object is authorized, the "YES" branch of decision block 718 is taken, the object is modified on storage media in block 720, and a modify success is indicated in block 722.

In FIG. 8, illustrating read request 800, data handler 120 sends a UUID to storage controller 132 in block 812. The UUID may or may not include an authentication key. In response to receiving the UUID, storage controller 132 streams the metadata from the object associated with the UUID to data handler 120 in block 814. A decision is made as to whether or not the key provided in the UUID matches the key in the metadata in decision block 816. If not, the "NO" branch of decision block 816 is taken, and a read failure is indicated in block 826. If the key provided in the UUID matches the key in the metadata, the "YES" branch of decision block 816 is taken, and a decision is made as to whether a read of the object is authorized in decision block 818. If not, the "NO" branch of decision block 818 is taken, and a read failure is indicated in block 824. If a read of the object is authorized, the "YES" branch of decision block 818 is taken, the object is read from storage media in block 820, and a read success is indicated in block 822.

In FIG. 9, illustrating delete request 900, data handler 120 sends a UUID to storage controller 132 in block 912. The UUID may or may not include an authentication key. In response to receiving the UUID, storage controller 132 streams the metadata from the object associated with the UUID to data handler 120 in block 914. A decision is made as to whether or not the key provided in the UUID matches the key in the metadata in decision block 916. If not, the "NO" branch of decision block 916 is taken, and a delete failure is indicated in block 924. If the key provided in the UUID matches the key in the metadata, the "YES" branch of decision block 916 is taken, and a decision is made as to whether a deletion of the object is authorized in decision block 918. If not, the "NO" branch of decision block 918 is taken, and a delete failure is indicated in block 924. If a delete of the object is authorized, the "YES" branch of decision block 918 is taken, the object is deleted from storage media in block 920, and a delete success is indicated in block 922.

Figure 10:
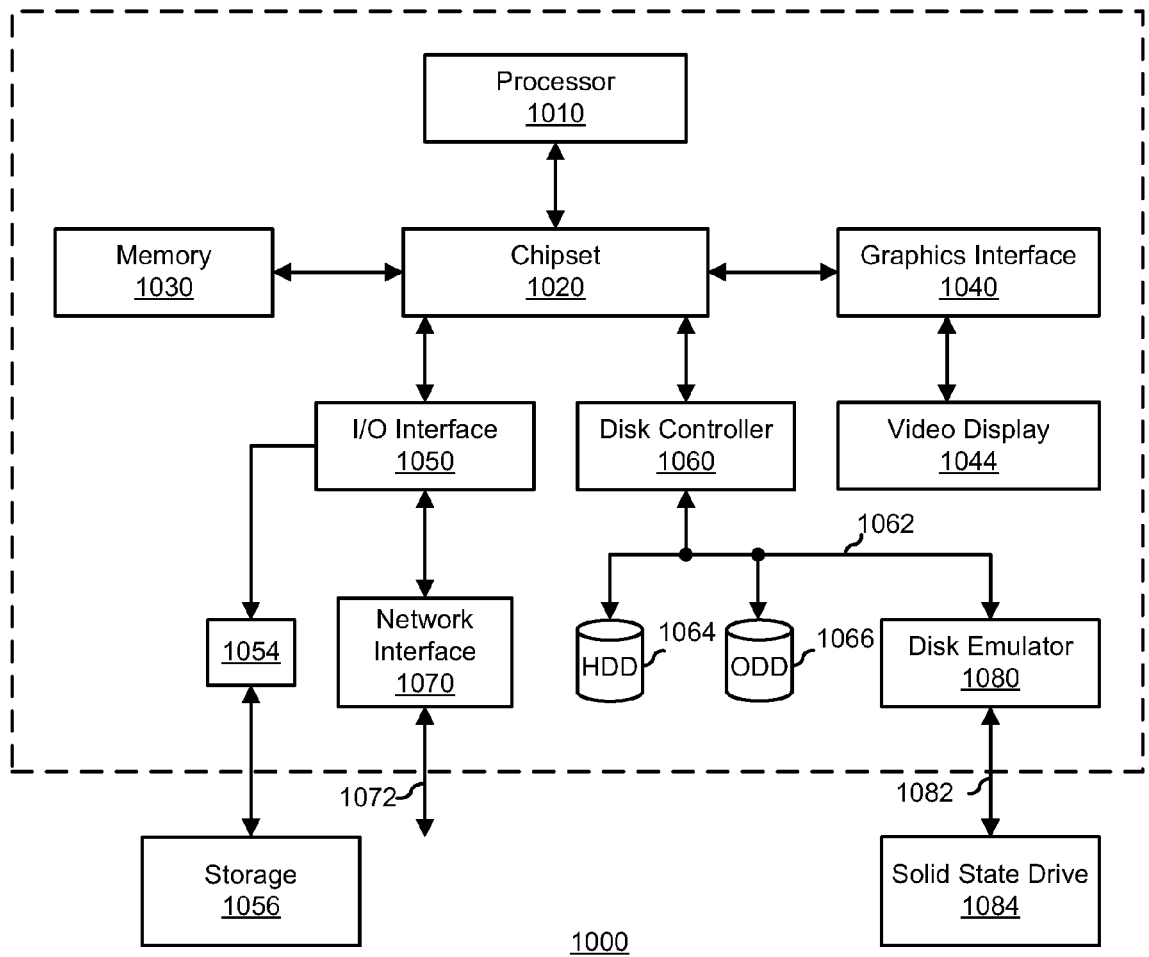
FIG. 10 is a functional block diagram illustrating an exemplary embodiment of an information handling system.

In a particular embodiment, an information handling system can be used to carry out one or more of the methods described above. In another embodiment, one or more of the systems described above can be implemented in the form of an information handling system. FIG. 10 illustrates a functional block diagram of an embodiment of an information handling system, generally designated as 1000. Information handling system 1000 includes processor 1010, a chipset 1020, a memory 1030, a graphics interface 1040, an input/output (I/O) interface 1050, a disk controller 1060, a network interface 1070, and a disk emulator 1080.

Processor 1010 is coupled to chipset 1020. Chipset 1020 supports processor 1010, allowing processor 1010 to process machine-executable code. In a particular embodiment (not illustrated), information handling system 1000 includes one or more additional processors, and chipset 1020 supports the multiple processors, allowing for simultaneous processing by each of the processors, permitting the exchange of information between the processors and the other elements of information handling system 1000. Processor 1010 can be coupled to chipset 1020 via a unique channel, or via a bus that shares information between processor 1010, chipset 1020, and other elements of information handling system 1000.

Memory 1030 is coupled to chipset 1020. Memory 1030 can be coupled to chipset 1020 via a unique channel, or via a bus that shares information between chipset 1020, memory 1030, and other elements of information handling system 1000. In particular, a bus can share information between processor 1010, chipset 1020 and memory 1030. In a particular embodiment (not illustrated), processor 1010 is coupled to memory 1030 through a unique channel. In accordance with another aspect (not illustrated), an information handling system can include a separate memory dedicated to each of the processors. A non-limiting example of memory 1030 includes static, dynamic. Or non-volatile random access memory (SRAM, DRAM, or NVRAM), read only memory (ROM), flash memory, another type of memory, or any combination thereof.

Graphics interface 1040 is coupled to chipset 1020. Graphics interface 1040 can be coupled to chipset 1020 via a unique channel, or via a bus that shares information between chipset 1020, graphics interface 1040, and other elements of information handling system 1000. Graphics interface 1040 is coupled to a video display 1044. Other graphics interfaces (not illustrated) can also be used in addition to graphics interface 1040 if needed or desired. Video display 1044 can include one or more types of video displays, such as a flat panel display or other type of display device.

I/O interface 1050 is coupled to chipset 1020. I/O interface 1050 can be coupled to chipset 1020 via a unique channel, or via a bus that shares information between chipset 1020, I/O interface 1050, and other elements of information handling system 1000. Other I/O interfaces (not illustrated) can also be used in addition to I/O interface 1050 if needed or desired. I/O interface 1050 is coupled to one or more add-on resources 1054. Add-on resource 1054 is connected to a storage device 1056, and can also include another data storage device, a graphics interface, a network interface card (NIC), a sound/video processing card, another suitable add-on resource or any combination thereof.

Network interface device 1070 is coupled to I/O interface 1050. Network interface 1070 can be coupled to I/O interface 1050 via a unique channel, or via a bus that shares information between I/O interface 1050, network interface 1070, and other elements of information handling system 1000. Other network interfaces (not illustrated) can also be used in addition to network interface 1070 if needed or desired. Network interface 1070 can be a network interface card (NIC) disposed within information handling system 1000, on a main circuit board (e.g., a baseboard, a motherboard, or any combination thereof), integrated onto another component such as chipset 1020, in another suitable location, or any combination thereof. Network interface 1070 includes a network channel 1072 that provide interfaces between information handling system 1000 and other devices (not illustrated) that are external to information handling system 1000. Network interface 1070 can also include additional network channels (not illustrated).

Disk controller 1060 is coupled to chipset 1010. Disk controller 1060 can be coupled to chipset 1020 via a unique channel, or via a bus that shares information between chipset 1020, disk controller 1060, and other elements of information handling system 1000. Other disk controllers (not illustrated) can also be used in addition to disk controller 1060 if needed or desired. Disk controller 1060 can include a disk interface 1062. Disk controller 1060 can be coupled to one or more disk drives via disk interface 1062. Such disk drives include a hard disk drive (HDD) 1064 or an optical disk drive (ODD) 1066 (e.g., a Read/Write Compact Disk (R/W-CD), a Read/Write Digital Video Disk (R/W-DVD), a Read/Write mini Digital Video Disk (R/W mini-DVD), or another type of optical disk drive), or any combination thereof. Additionally, disk controller 1060 can be coupled to disk emulator 1080. Disk emulator 1080 can permit a solid-state drive 1084 to be coupled to information handling system 1000 via an external interface 1082. The external interface 1082 can include industry standard busses (e.g., USB or IEEE 1384 (Firewire)) or proprietary busses, or any combination thereof. Alternatively, solid-state drive 1084 can be disposed within information handling system 1000.

In the embodiments described above, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described above can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:
1. A data storage system comprising:
a storage device; and
a data handler coupled to the storage device and operable to:
 receive object content;
 create metadata associated with the object content, wherein the metadata includes:
  a key;
  a first authorization field; and
  a second authorization field;
 create a data object including the object content and the metadata;
 store the data object on the storage device;
 receive a first access request for the data object;
 determine that the first access request includes the key;
 determine that the first access request includes information associated with the first authorization field in response to determining that the first access request includes the key;

permit an execution of a first operation on the data object in response to determining that the first access request includes information associated with the first authorization field;

receive a second access request for the data object;

determine that the second access request includes the key;

determine that the second access request includes information associated with the second authorization field in response to determining that the second access request includes the key; and deny the execution of the first operation on the data object in response to determining that the second access request includes information associated with the second authorization field.

2. The data storage system of claim 1, wherein the first and second authorization fields each include a plurality of operation fields operable to permit a plurality of operations on the data object, the operation fields including at least one of:

a first operation field to enable writing of the data object to the storage device;

a second operation field to enable modifying of the data object on the storage device;

a third operation field to enable reading of the data object from the storage device; and a fourth operation field to enable deleting of the data object from the storage device.

3. The data storage system of claim 2, wherein:

the first authorization field includes a first type field;

the second authorization field includes a second type field;

in determining that the first access request includes information associated with the first authorization field, the data handler is further operable to determine if the first access request includes the first type field; and in determining that the second access request includes information associated with the second authorization field, the data handler is further operable to determine if the second access request includes the second type field.

4. The data storage system of claim 3, wherein the first access request corresponds with the first type field when the first access request is received from a user group associated with the first type field.

5. The data storage system of claim 3, wherein the first access request corresponds with the first type field when the first access request is received at a first particular time, wherein the first particular time relative to a second particular time that is indicated by the first type field.

6. The data storage system of claim 5, wherein the first particular time is before the second particular time.

7. The data storage system of claim 5, wherein the first particular time is after the second particular time.

8. The data storage system of claim 1, wherein the data handler is further operable to:

deny an execution of a second operation on the data object in response to determining that the first access request includes information associated with the first authorization field; and permit the execution of the second operation on the data object in response to determining that the second access request includes information associated with the second authorization field.

9. A method comprising:

receiving object content at a data handler coupled to a storage device;

creating metadata associated with the object content, wherein the metadata includes:

a key;

a first authorization field; and a second authorization field creating a data object including the object content and the metadata;

storing the data object on the storage device;

receiving a first access request for the data object;

determining that the first access request includes the key;

determining that the first access request includes information associated with the first authorization field in response to determining that the first access request includes the key;

permitting an execution of a first operation on the data object in response to determining that the first access request includes information associated with the first authorization field receiving a second access request for the data object;

determining that the second access request includes the key;

determining that the second access request includes information associated with the second authorization field in response to determining that the second access request includes the key; and denying the execution of the first operation on the data object in response to determining that the second access request includes information associated with the second authorization field.

10. The method of claim 9, wherein the first and second authorization fields each include a plurality of operation fields operable to permit a plurality of operations on the data object, the operation fields including:

a first operation field to enable writing of the data object to the storage device;

a second operation field to enable modifying of the data object on the storage device;

a third operation field to enable reading of the data object from the storage device; and a fourth operation field to enable deleting of the data object from the storage device.

11. The method of claim 10, wherein:

the first authorization field includes a first type field;

the second authorization field includes a second type field;

in determining that the first access request includes information associated with the first authorization field, the method further comprises determining if the first access request includes the first type field; and in determining that the second access request includes information associated with the second authorization field, the method further comprises determining if the second access request includes the second type field.

12. The method of claim 11, wherein the first access request corresponds with the first type field when the first access request is received from a user group associated with the first type field.

13. The method of claim 11, wherein the first access request corresponds with the first type field when the first access request is received at a first particular time, wherein the first particular time relative to a second particular time that is indicated by the first type field.

14. The method of claim 9, further comprising:

denying an execution of a second operation on the data object in response to determining that the first access request includes information associated with the first authorization field; and permitting the execution of the second operation on the data object in response to determining that the second access request includes information associated with the second authorization field.

15. Machine-executable code for an information handling system, wherein the machine-executable code is embedded within a non-transitory medium and includes instructions for carrying out a method, the method comprising:
- receiving object content at a data handler coupled to a storage device;
- creating metadata associated with the object content, wherein the metadata includes:
  - a key;
  - a first authorization field;
- creating a data object including the object content and the metadata;
- storing the data object on the storage device;
- receiving a first access request for the data object;
- determining that the first access request includes the key;
- determining that the first access request includes information associated with the first authorization field in response to determining that the request includes the key;
- permitting an execution of a first operation on the object in response to determining that the first access request includes information associated with the first authorization field;
- receiving a second access request for the data object;
- determining that the second access request includes the key;
- determining that the second access request includes information associated with the second authorization field in response to determining that the second access request includes the key; and
- denying the execution of the first operation on the data object in response to determining that the second access request includes information associated with the second authorization field.

16. The machine-executable code of claim 15, wherein:
the first authorization field includes a first type field;
the second authorization field includes a second type field;
in determining that the first access request includes information associated with the first authorization field, the method further comprises determining if the first access request includes the first type field; and
in determining that the second access request includes information associated with the second authorization field, the method further comprises determining if the second access request includes the second type field.

17. The machine-executable code of claim 16, wherein the first access request corresponds with the first type field when the first access request is received from a user group associated with the first type field.

18. The machine-executable code of claim 17, wherein the first access request corresponds with the first type field when the first access request is received at a first particular time, wherein the first particular time relative to a second particular time that is indicated by the first type field.

19. The machine-executable code of claim 15, the method further comprising:
- denying an execution of a second operation on the data object in response to determining that the first access request includes information associated with the first authorization field; and
- permitting the execution of the second operation on the data object in response to determining that the second access request includes information associated with the second authorization field.

* * * * *